July 30, 1963     W. J. RENEHAN     3,099,015
JOINT FOR INTERCONNECTING TUBULAR MEMBERS
Filed June 14, 1960

INVENTOR.
W. J. RENEHAN

United States Patent Office 3,099,015
Patented July 30, 1963

3,099,015
JOINT FOR INTERCONNECTING TUBULAR MEMBERS
William J. Renehan, North Plainfield, N.J.
(36 Howitt Road, West Roxbury, Mass.)
Filed June 14, 1960, Ser. No. 36,048
3 Claims. (Cl. 2—270)

The invention relates to a joint for interconnecting tubular members and more particularly to a joint for interconnecting a glove to an arm sleeve in a readily detachable manner.

Natural or synthetic rubber gloves having elongated arm sleeves are widely used in industry for a variety of special types of work, for example, for apparatus which must be assembled in a controlled atmosphere. In such instances, the apparatus is located within a special housing with the assembler remaining external to the housing. The upper end of the arm sleeves are attached to parts in the protective housing wall so that the assembler can place his hands and arms through the ports and into the gloves to perform the necessary operations on the apparatus. In other instances, the gloves serve as a protection for the worker against contaminants which may be used within the housing.

Heretofore, protective gloves and sleeves have been of a one piece construction, that is, the glove portion has not been detachable from the arm sleeve. This construction necessitates replacing both the glove and arm sleeve, when a glove becomes worn. A further development in the protective glove field evolved in which the glove and arm sleeve were detachable so that a new glove could be attached to the old arm sleeve. These developments had the disadvanatge that the arm sleeve must be removed from the port of the protective housing in order to replace the glove or the glove must be replaced from within the protective housing. In both cases the special atmosphere within the protective housing would be disturbed.

It is, therefore, an object of the invention to provide a quick and inexpensive joint for detachably interconnecting a glove to an arm sleeve.

It is another object of the invention to provide a joint for detachably inter-connecting tubular members which tightens as pressure is applied by a pull on either tubular member.

It is another object of the invention to provide a joint for detachably interconnecting a glove to an arm sleeve when the arm sleeve is inside out, which condition exists when the glove and sleeve are drawn, outside of the housing without detaching the sleeve from the port.

It is a further object of the invention to provide a joint for detachably interconnecting a glove to an arm sleeve without substantially upsetting the atmosphere in the protective housing with which it is used.

The invention consists of a joint for detachably interconnecting a glove to an arm sleeve by means of a wrist ring and elastic band, so that the ring and band are positioned within the confines of the sleeve. The steps for assembling the main embodiment consist of inserting a predetermined length of the cuff of the sleeve through the interior of the ring, positioning the predetermined length of the sleeve cuff and the cuff of the glove over the exterior of the ring, placing the elastic band over the portion of the glove cuff encircling the ring, and turning the sleeve and glove inside out by moving the attached glove through the interior of the wrist ring and arm sleeve.

The above-mentioned and other features and objects of this invention and the manner of attaining them will become more apparent and the invention itself will be best understood by reference to the following description of an embodiment of the invention taken in conjunction with the accompanying drawing, wherein.

Figure 1:
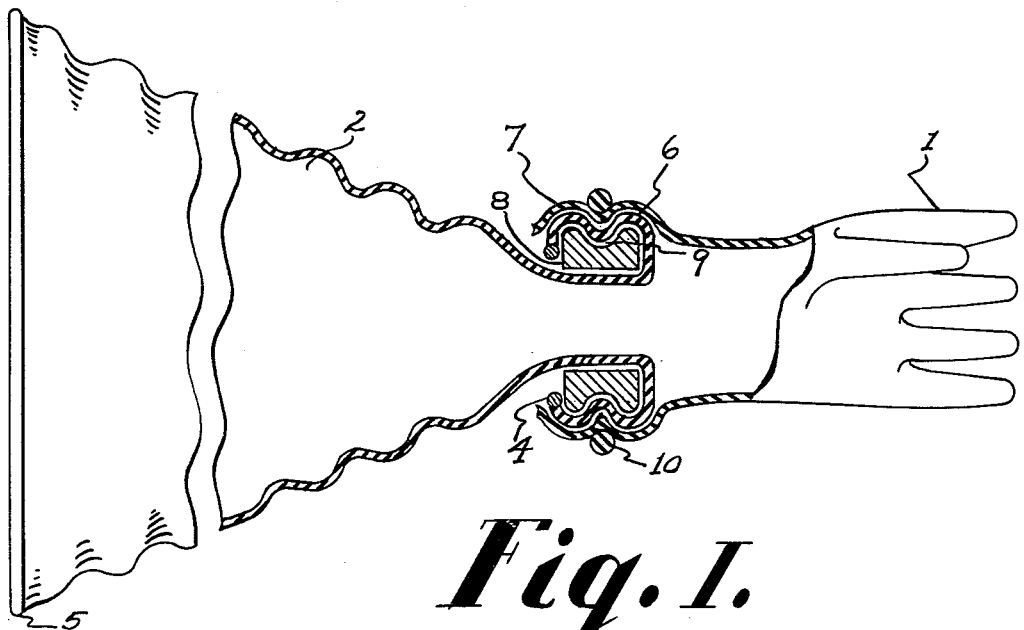
FIG. 1 is a cross-sectional view of the detachable interconnection between the glove and the arm sleeve when the arm sleeve and glove is in the reversed or inside-out position.

Referring to FIG. 1 there is shown a glove 1 interconnected to an arm sleeve 2. The shoulder end of the arm sleeve may be connected to a port in a protective housing by means of a bead 5 on the arm sleeve to provide a sealed connection.

The arm sleeve 2 has an accordian or convoluted surface which has a diameter which diminishes as the wrist end of the sleeve is approached. The larger diameter is approximately 8 inches to fit the port opening and diminishes approximately to 3½ inches at the wrist end. The sleeve 2 is made of rubber or synthetic resilient material which is of sufficient guage to withstand the pressures and wear under which it is used. The usual guage would be in the range of ten mills to 65 mills. The wrist end of the sleeve 2 has a wrist cuff 6 and bead 4 both of which are utilized in attaching the glove to the sleeve as will be explained hereinafter.

The glove 1 is likewise made of rubber or synthetic material and may consist of any suitable guage. The majority of the known types of rubber gloves and mittens would be suitable with the only restriction being that they contain a glove cuff 7 which is at least one inch and preferably three inches wide. This cuff 7 is also used in making the sealed connection between the glove 1 and the arm sleeve 2.

Figure 2:
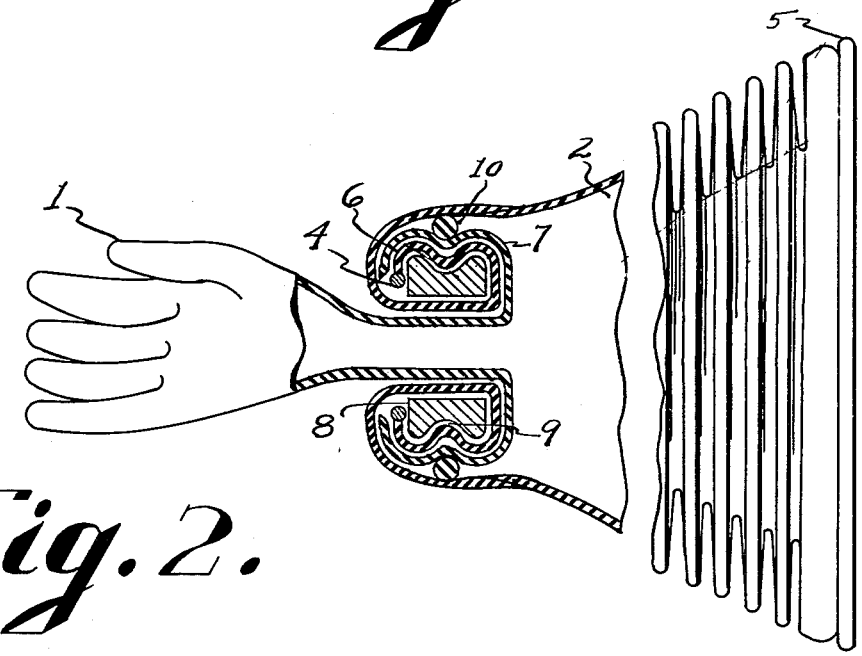
FIG. 2 is a cross-sectional view of the interconnection between the glove and arm sleeve when they are positioned within the confines of the protective housing.

As can be seen from FIGS. 1 or 2 the interconnection between the glove 1 and the sleeve 2 includes a wrist ring 8. This ring 8 is made preferably of aluminum or plastic for its lightweight characteristics but any suitable metal could be used. The periphery of ring 8 contains a groove 9. The ring 8 is of great enough diameter that the cuffs of both the sleeve and glove can be stretched thereover. The bead 4 on the end of cuff 6 tends to lock behind the ring 8 when the cuff is placed thereover. This prevents the wrist cuff from slipping forward over the ring. The cuffs 6 and 7 are locked or sealed in place by means of an elastic band 10 of a slightly smaller diameter than the wrist ring 8. This band 10 may be stretched over the cuffs 6 and 7 and into the groove 9 of the ring 8 making a tight or sealed joint holding the cuffs 6 and 7 in place.

The various steps for assembling the interconnection between the glove 1 and sleeve 2 are as follows. A predetermined length of the wrist cuff 6 is inserted through the opening of the ring. This predetermined length of the wrist cuff 6 and a substantially equal length of the glove cuff 7 are positioned over the exterior of the ring. The elastic band 10 is then placed in position over the glove cuff 7 encircling the ring 8. The glove 1 and sleeve 2 are reversed or turned inside out by moving the glove through the interior of the wrist ring 8 and arm sleeve 2. A fold is thus formed in both cuffs overlying one end of said ring and the sleeve cuff is reverse folded about the other end of the ring. This results in the sealed joint or interconnection being within the confines of the sleeve 2.

An alternative assembly for interconnecting the sleeve cuff 6 and the glove cuff 7 over the ring 8 may also be performed by folding a predetermined length of the sleeve cuff 6 over the exterior of the ring 8 so that bead 4 locks behind ring 8 then inserting the ring and folded sleeve cuff 6 into the interior of the glove cuff 7.

Another alternative assembly for interconnecting the sleeve cuff 6 and glove cuff 7 consists of forming a reverse fold on the glove cuff 7 then inserting the folded glove cuff 7 into the interior of the predetermined length of the sleeve cuff 6. The predetermined length of the sleeve cuff 6 and the folded portion of the glove cuff 7 are folded together over the exterior of the ring 8. The above step of forming a reverse fold on the glove cuff 7 also may include the step of inserting the gloove cuff 7 a predetermined distance through the elastic band 10 so that when the reverse fold is formed on the glove cuff 7 the elastic band 10 will be therein. Therefore, when the folded glove cuff is inserted in the sleeve cuff 6 and these cuffs are folded together over the ring 8 the elastic band 10 will already be substantially in place.

What is claimed is:

1. The combination of flexible tubular members arranged in circumferentially overlapped relation adjacent registering ends thereof, a rigid ring, a circumferential groove in the outside of said ring, the registering ends of said overlapped portions bearing against one end of said ring and a fold in said overlapped portions bearing against the other end of said ring, a resilient band constrictively encircling said ring and confining the part of said overlapped portions overlying the groove in sealing relationship with said ring, said overlapped portions extending through said ring with the outermost portion reverse folded about the ring to confine the ends and the resilient band between itself and the ring.

2. A joint comprising a pair of flexible tubular members arranged in circumferentially overlapped relation adjacent registering ends thereof, an endless rigid ring having an endless groove in the outside surface thereof, the registering ends of said overlapped portions bearing against one end of said ring and a fold in said overlapped portions bearing against the other end of said ring, an elastic band constrictively encircling said ring and confining said lapped portions extending across the outer side of said ring in said groove, both plies of said lapped portions extending through said ring and the outermost ply being reverse folded about the ring to confine the ends and the resilient band between itself and the ring whereby said joint tightens as pressure is applied by a pull on either of said tubular members.

3. A joint for detachably interconnecting a glove to an arm sleeve comprising a rigid ring having an outer circumferential groove, a sleeve cuff and a glove cuff arranged in circumferentially overlapped relationship adjacent registering ends thereof with said sleeve cuff forming the inside ply, said registering ends bearing against one end of said rigid ring and a fold in said overlapped portions of said sleeve and glove cuff overlying the other end of said ring, a resilient band surrounding said sleeve and glove cuffs and confining the surrounded portions in said groove to form a seal, said overlapped portions of said sleeve and glove cuffs extending through said ring and said sleeve cuff being reverse folded about the ring to confine said registering ends and said resilient band between itself and the ring whereby a pull applied to said glove tightens said joint.

References Cited in the file of this patent

UNITED STATES PATENTS

| | | |
|---|---|---|
| 2,473,033 | Letac | June 14, 1949 |
| 2,655,663 | Hoagland | Oct. 20, 1953 |
| 2,759,692 | Bohl et al. | Aug. 21, 1956 |
| 2,813,272 | Hagan | Nov. 19, 1957 |
| 2,842,771 | Foti | July 15, 1958 |
| 2,842,773 | Trexler | July 15, 1958 |
| 2,862,307 | Bloomer et al. | Dec. 2, 1958 |

FOREIGN PATENTS

| | | |
|---|---|---|
| 877,114 | Germany | May 21, 1953 |